US012755721B2

(12) United States Patent
Nakajima et al.

(10) Patent No.: US 12,755,721 B2

(45) Date of Patent: Oct. 6, 2026

(54) INPUT APPARATUS, ELECTRONIC KEYBOARD INSTRUMENT AND ELECTRONIC APPARATUS

(71) Applicant: CASIO COMPUTER CO., LTD., Tokyo (JP)

(72) Inventors: Yuuki Nakajima, Tokyo (JP); Shingo Fukushima, Tokyo (JP); Shigeyuki Nagatsuma, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 258 days.

(21) Appl. No.: 18/763,245

(22) Filed: Jul. 3, 2024

(65) Prior Publication Data

US 2025/0014552 A1 Jan. 9, 2025

(30) Foreign Application Priority Data

Jul. 4, 2023 (JP) ................................ 2023-109723

(51) Int. Cl.

*F21V 3/02* (2006.01)
*F21V 7/00* (2006.01)
*G10H 1/34* (2006.01)

(52) U.S. Cl.

CPC ................ *G10H 1/34* (2013.01); *F21V 3/02* (2013.01); *F21V 7/00* (2013.01); *G10H 2220/061* (2013.01); *G10H 2220/161* (2013.01); *G10H 2220/221* (2013.01)

(58) Field of Classification Search

CPC ............... G10H 1/34; G10H 2220/061; G10H 2220/161; G10H 2220/221; G10H 2220/411; G10H 1/32; G10H 1/0551; F21V 3/02; F21V 7/00; G06F 3/03547; G06F 3/0412

See application file for complete search history.

(56) References Cited

U.S. PATENT DOCUMENTS 6,107,997 A * 8/2000 Ure .................... G06F 3/03547 345/157
11,556,211 B2 * 1/2023 Lipman ............... G06F 3/03542
2010/0073314 A1 * 3/2010 Lo ........................ G06F 3/0238 345/173

FOREIGN PATENT DOCUMENTS

JP 2007-068173 A 3/2007
JP 2013-077555 A 4/2013
JP 2020-167074 A 10/2020

* cited by examiner

*Primary Examiner* — Elmito Breval

(74) *Attorney, Agent, or Firm* — Fitch, Even, Tabin & Flannery LLP

(57) ABSTRACT

An input apparatus includes a touch detection substrate having a first opening and including a touch pattern provided on an outer circumference of the first opening, a control substrate having a light emitting element, a reflector provided between the touch detection substrate and the control substrate and including a light reflection region disposed in such a manner as to correspond to the light emitting element, a panel including a touch surface, and a case having a second opening and to which the panel is attached, and light emitted by the light emitting element is released to an exterior by way of the first opening and the second opening, and the case and the reflector are detachably fixed together with a fastening component.

13 Claims, 8 Drawing Sheets

INPUT APPARATUS, ELECTRONIC KEYBOARD INSTRUMENT AND ELECTRONIC APPARATUS

CROSS-REFERENCE TO RELATED APPLICATION

This application is based upon and claims the benefit of priority under 35 USC 119 of Japanese Patent Application No. 2023-109723 filed on Jul. 4, 2023, the entire disclosure of which, including the specification, claims, drawings and abstract, is incorporated herein by reference in its entirety.

BACKGROUND

Technical Field

The present disclosure relates to an input apparatus, an electronic keyboard instrument and an electronic apparatus.

Description of the Related Art

There have conventionally been provided touch-type input apparatuses for performing setting, adjusting and other control operations for an electronic apparatus.

Japanese Unexamined Patent Application Publication No. 2020-167074 discloses an input apparatus including an electrostatic capacity-type touch sensor.

This input apparatus includes a glass substrate having a touch-sensitive or touch surface and an electrostatic capacity-type touch sensor provided on an opposite side to the touch surface, a design layer disposed on a side facing the touch sensor and made up by printing or of a film base material, a light guiding plate, and a circuit board on which an LED is provided to illuminate a design element provided on the design layer via the light guiding plate, which are placed layer on layer.

SUMMARY

According to an aspect of the present disclosure, there is provided an input apparatus including a touch detection substrate having a first opening and including a touch pattern provided on an outer circumference of the first opening, a control substrate having a light emitting element, a reflector provided between the touch detection substrate and the control substrate and including a light reflection region disposed in such a manner as to correspond to the light emitting element, a panel including a touch surface, and a case having a second opening and to which the panel is attached, wherein light emitted by the light emitting element is released to an exterior by way of the first opening and the second opening, and wherein the case and the reflector are detachably fixed together with a fastening component.

According to another aspect of the present disclosure, there is provided an electronic keyboard instrument including the input apparatus described above and a keyboard, wherein the input apparatus is provided in a position of a keyblock which lies adjacent to the keyboard.

According to still another aspect of the present disclosure, there is provided an electronic apparatus including the input apparatus according to claim 1; and an output apparatus.

DESCRIPTION OF THE EMBODIMENT

A touch sensor is disposed without providing any space between a touch-sensitive or touch surface and the touch sensor, whereby a touch detection can be performed effectively. As a result, a touch sensor of a conventional touch-type input apparatus is attached strongly and rigidly to a glass substrate with an adhesive or the like so that the touch sensor is not detached from the glass substrate. When the touch sensor fails, however, it is not easy to replace only the touch sensor, and hence, there has also been occurring a case in which the glass substrate to which the touch sensor is attached or the input apparatus including the glass substrate is replaced altogether.

The present disclosure relates to an input apparatus which has superior replaceability and which can perform an effective touch detection, an electronic apparatus and an electronic keyboard instrument.

Figure 1:
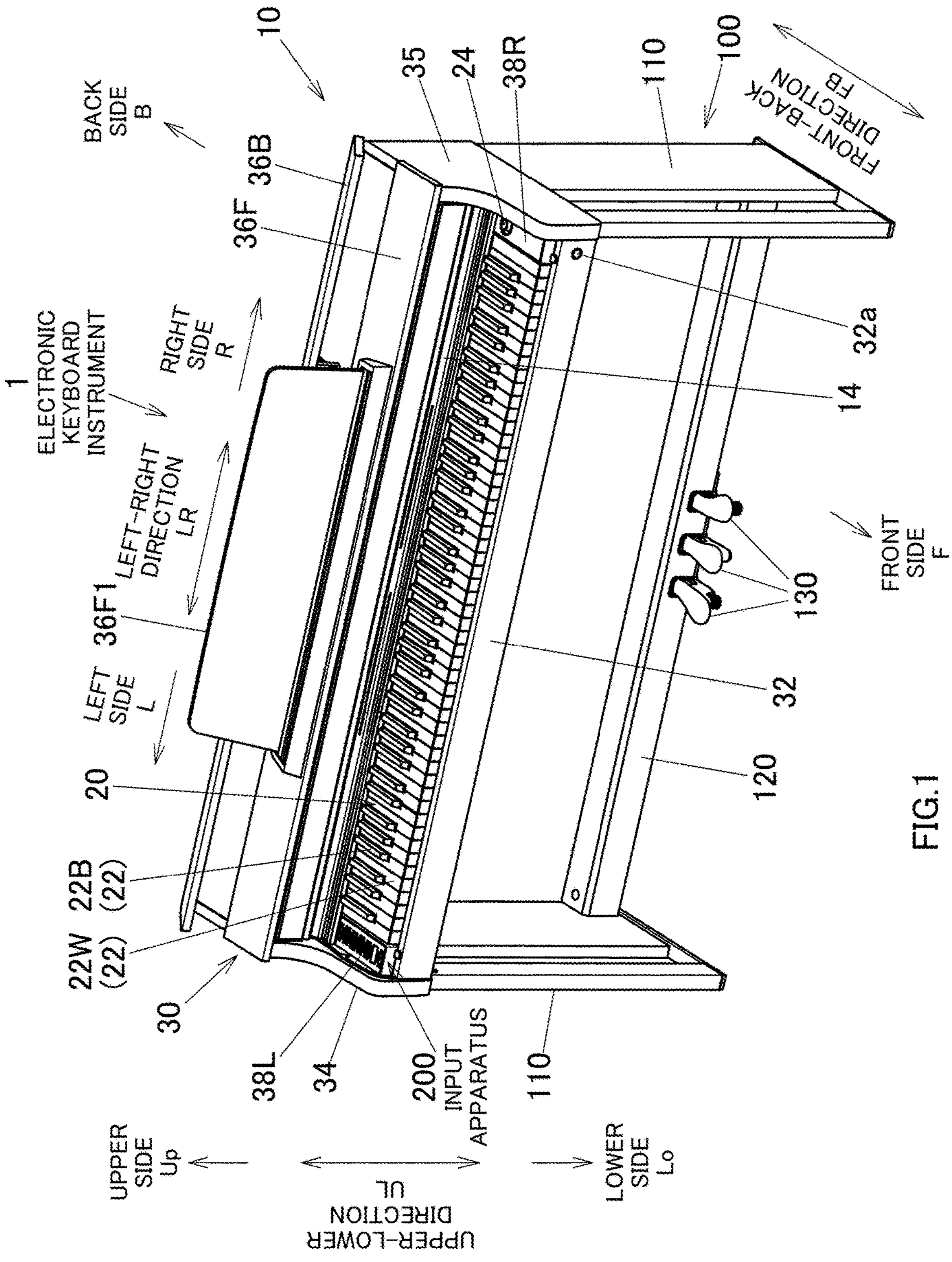
FIG. 1 is an overall perspective view of an electronic keyboard instrument according to an embodiment of the present disclosure as viewed from a front side.

Referring to drawings, an embodiment of the present disclosure will be described. An electronic keyboard instrument 1 shown in FIG. 1, which is an electronic apparatus, includes a main body part 10 and a leg part 100. The main body part 10 includes a keyboard 20 which has multiple keys 22 made up of white keys 22W and black keys 22B and a main body case 30 on which the keyboard 20 is provided. The leg part 100 includes a pair of side plates 110, a pedal frame 120, and a pedal device 130. In the following description, with the keyboard 20 disposed on a nearer side, a front side (a nearer side) in a front-back direction FB of the key of the keyboard 20 (a longitudinal direction of the key) is referred to as a front side F, and a back side (a farther side) in the front-back direction FB of the key is referred to as a back side B. When facing the keyboard 20, a left side is referred to as a left side L, and a right side is referred to as a right side R. Then, an alignment direction of the multiple keys of the keyboard 20 is referred to as a left-right direction LR. In addition, in an upper-lower direction UL of the electronic keyboard instrument 1, an upper side is referred to as an upper side Up, and a lower side is referred to as a lower side Lo.

The pair of side plates 110 are component plates which are erected on a setting surface on both a left and right sides of the electronic keyboard instrument 1 in such a posture that two plate surfaces of each component plate are oriented in the left-right direction LR. The pedal frame 120 extends between the side plates 110 to connect them together at lower end portions of the side plates 110. The pedal device 130 is provided at a substantially central portion of the pedal frame 120 in the left-right direction LR. The main body part 10 is supported by the leg part 100.

In the main body part 10, when viewed from an upper side thereof, the main body case 30 has a laterally elongated, substantially rectangular shape in which a longitudinal direction thereof follows the left-right direction LR and has component plates such as a front plate 32 which is provided on a lower side Lo of a front side F of the keyboard 20, a left side plate 34 and a right side plate 35 which are provided on a left and right sides of the front plate 32 in such a manner as to connect to a left and right ends of the front plate 32, respectively, a front upper plate 36F which is provided backwards and upwards of the keyboard 20 in such a manner as to connect to the left side plate 34 and the right side plate 35, a back plate (not shown) which faces the front plate 32 and constitutes a back surface of the main body case 30, and a lower plate (not shown) which constitutes a lower surface of the main body case 30. A back upper plate 36B is provided on a back side B of the front upper plate 36F in such a manner as to be opened freely. A music stand 36F1 is attached to a substantially central portion of the front upper plate 36F in the left-right direction LR.

Figure 2:
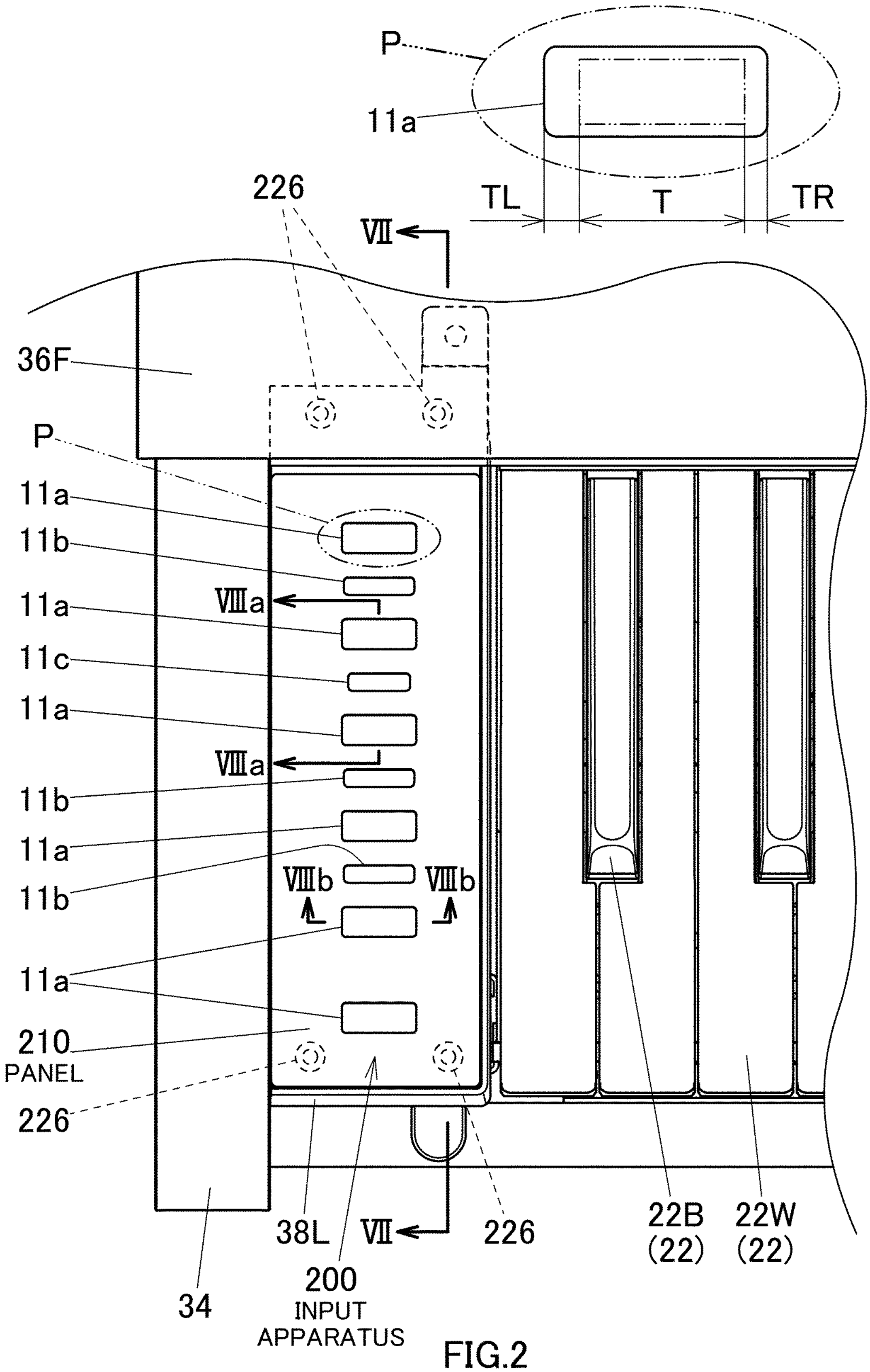
FIG. 2 is an enlarged plan view of an input apparatus provided on a left keyboard wing of the electronic keyboard instrument according to the embodiment of the present disclosure.

A volume knob 24 for controlling the volume of sound to be produced is provided on a right keyboard wing 38R which constitutes a keyboard wing defined between the keyboard 20 and the right side plate 35. A power supply button 32*a* is provided on the front plate 32 below the right keyboard wing 38R. As also shown in FIG. 2, an input apparatus 200 is provided at a left keyboard wing 38L which constitutes a keyboard wing defined between the keyboard 20 and the left side plate 34 (is provided in the position of a keyblock disposed between the side plate and the keyboard on the keyboard instrument), and this input apparatus 200 can set and control the electronic keyboard instrument 1 by touching operations.

Figure 3:
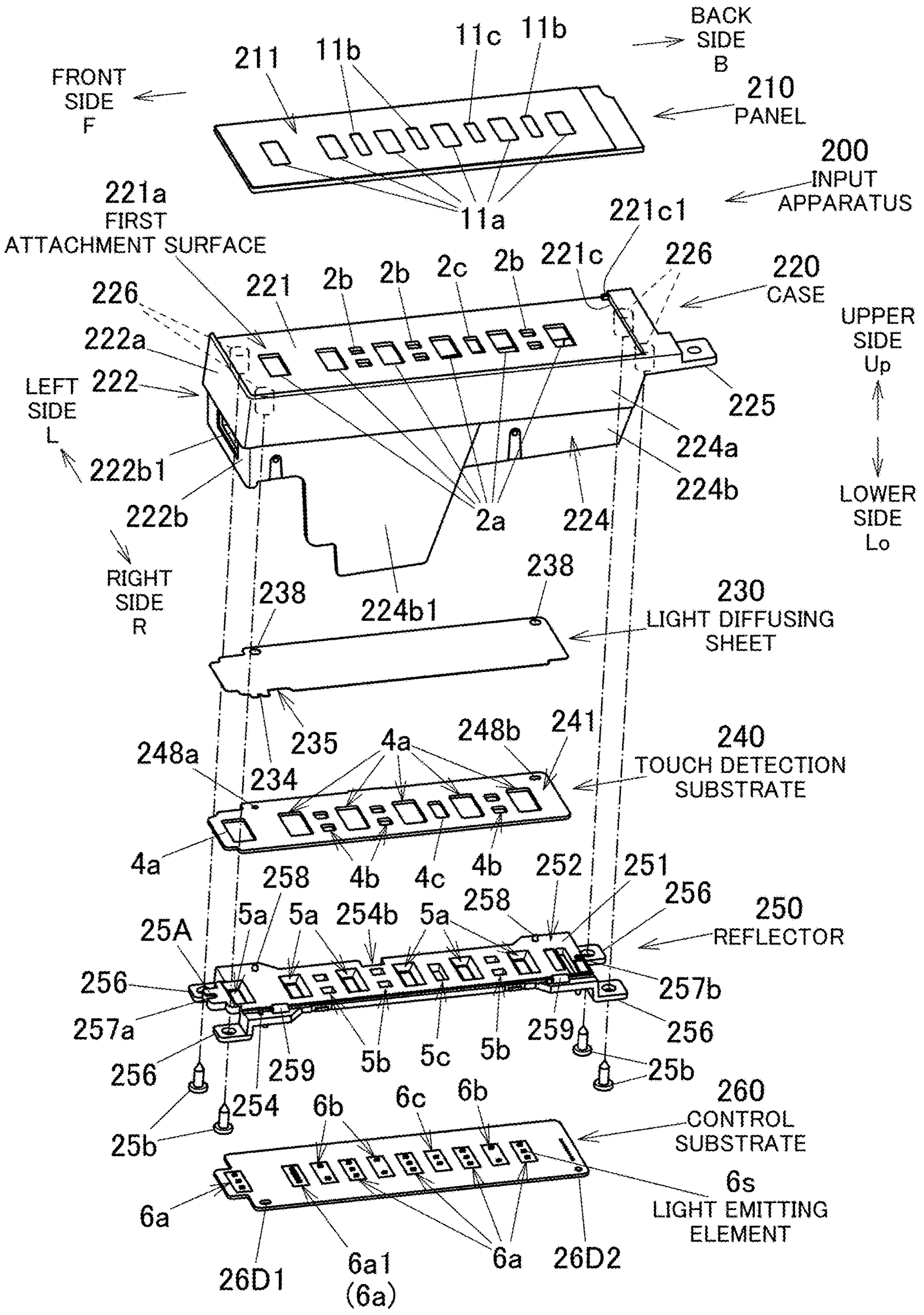
FIG. 3 is an exploded perspective view of the input apparatus according to the embodiment of the present disclosure.

As shown in FIG. 3, the input apparatus 200 includes a panel 210, a case 220, a light diffusing sheet 230, a touch detection substrate 240, a reflector 250, and a control substrate 260. The panel 210 is a substantially rectangular plate-like component which is made of a transparent resin material such as acryl and is elongated in the front-back direction FB. An upper surface of the panel 210 is made into a touch-sensitive or touch surface 211 with which the finger is brought into contact when a touch operation is performed. A surface of the panel 210 (a lower surface of the panel 210) which lies opposite to the touch surface 211 is painted black on other portions than light transmission portions 11*a*, 11*b*, 11*c* which constitute regions corresponding to light emitting elements 6*s* of multiple light emitting regions 6*a*, 6*b*, 6*c*, which will be described later, from the lower surface side to shield lights from the light emitting elements 6*s* of the multiple light emitting regions 6*a*, 6*b*, 6*c*. The light transmission portions 11*a*, 11*b*, 11*c* are disposed to be aligned 11*a*, 11*a*, 11*b*, 11*a*, 11*b*, 11*a*, 11*c*, 11*a*, 11*b*, 11*a* sequentially from the front side F in that order.

The case 220 has a substantially rectangular parallelepiped box shape which is elongated in the front-back direction FB. The case 220 has an upper plate 221, which is provided in such a manner that plate surfaces thereof are oriented in the upper-lower direction UL, and this upper plate 221 includes a first attachment surface 221*a* which constitutes an upper surface to which the panel 210 is attached. The case 220 includes a front plate 222, a left side plate 223 (refer to FIG. 4) and a right side plate 224 which are provided in such a manner as to extend downwards substantially perpendicularly from the upper plate 221. The case 220 is opened on a back side B thereof. The upper plate 221 is caused to slightly slope down (for example, at three degrees from a horizontal plane) from the front side F to the back side B in such a manner as to match the multiple keys 22 (also, refer to FIG. 7). In the front plate 222 and the right side plate 224, upper portions 222*a*, 224*a* extend downwards in such a manner as to be perpendicular to the upper plate 221 which slopes downwards, and lower portions 222*b*, 224*b*, which connect to the upper portions 222*a*, 224*a*, respectively, extend downwards in such a manner as to be perpendicular to the horizontal plane. A substantially rectangular elongated hole 222*b*1 which is elongated in the left-right direction LR is provided in the lower portion 222*b* of the front plate 222. A substantially central portion of the left side plate 223 is cut out largely (refer to FIG. 4). A substantially front-half portion of the right side plate 224 is made into a protruding plate 224*b*1 which protrudes to the lower side Lo.

A wall-like raised section 221*c* is provided in such a manner as to be raised from the first attachment surface 221*a* of the upper plate 221 on a front side F, right side R and back side B of the upper plate 221. The raised section 221*c* has a height which is substantially the same as a thickness of the panel 210. The raised section 221*c* is opened on a left side L thereof, and a protrusion 221*cl* is provided at a left end of a back side F of the raised section 221*c*. Additionally, a screw hole section 225 having a screw hole is provided on a right side R of a back end of the case 220 in such a manner as to protrude therefrom towards the back side B.

The protruding plate 224*b*1 of the right side plate 224 is disposed in such a manner that a certain clearance is defined between a lower end of the protruding plate 224*b*1 and an upper surface of the lower plate of the main body case 30 so that vibrations are cut off when a sound is produced. The screw hole section 225 is fixed to a chassis (not shown) of the keyboard 20 which is fixed to the main body case 30. A metallic sheet (not shown), which is fixed to the main body case 30, is brought into engagement with the elongated hole 222*b*1 in the front plate 222. In this way, the case 220 is fixed to the main body case 30.

Multiple openings 2*a* (a second opening) are provided in the first attachment surface 221*a* of the upper plate 221 along the front-back direction FB (a longitudinal direction of the upper plate 221). The openings 2*a* are each made into a substantially rectangular through hole of which longitudinal direction follows the left-right direction LR. In the present embodiment, six openings 2*a* are provided. Three pairs of openings 2*b*, each pair being made up of two small rectangular holes aligned in the left-right direction LR, and a rectangular opening 2*c*, which is smaller than the opening 2*a*, are provided in such a manner as to be disposed individually between the adjacent openings 2*a*. The openings 2*a*, 2*b*, 2*c* in the case 220 are disposed in such a manner as to correspond to the light transmission portions 11*a*, 11*b*, 11*c* in the panel 210, respectively. As a result, the openings 2*a*, 2*b*, 2*c* are disposed to be aligned 2*a*, 2*a*, 2*b*, 2*a*, 2*b*, 2*a*, 2*c*, 2*a*, 2*b*, 2*a* sequentially from the front side F in that order.

Figure 4:
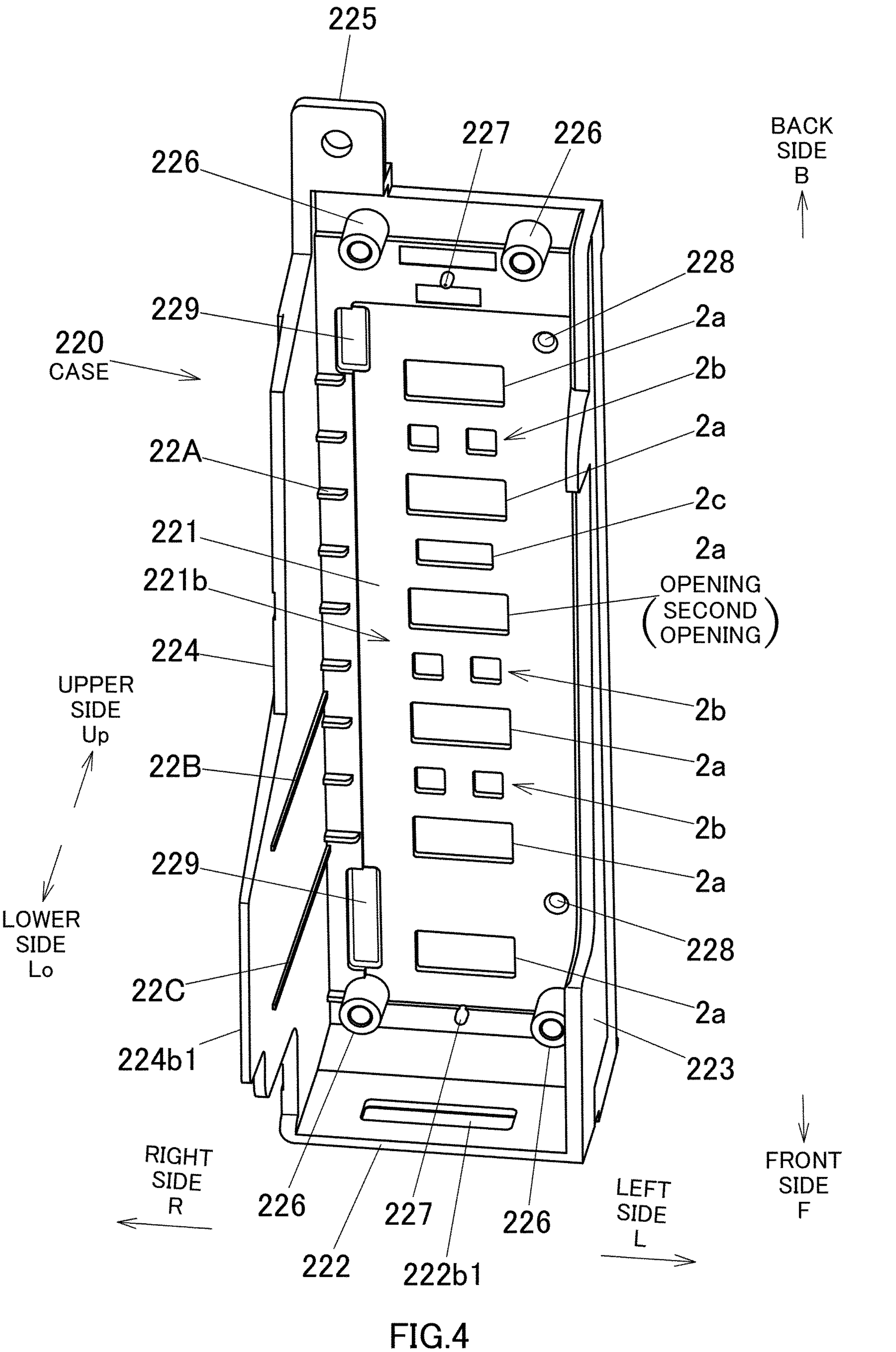
FIG. 4 is a perspective view of a case of the input apparatus according to the embodiment of the present disclosure as viewed from below.

As shown in FIG. 4, in total, four bosses 226 are provided on a surface of the upper plate 221 which lies opposite to the first attachment surface 221*a* of the upper plate 221 (that is, a lower surface 221*b* of the upper plate 221) with two bosses

226 disposed individually on a front side F ang back side B of the upper plate 221 in such a manner as to form a substantially rectangular shape which is long in the front-back direction FB. An internal thread (a fixing element) is formed in an inner side of each boss 226. Here, a tapping screw, which is a fastening component, is fastened inside the boss 226 while cutting a thread therein, whereby the thread is formed in the inner side of the boss 226. A positioning pin 227 is provided in the vicinity of a portion defined individually between the two bosses 226 on the front side F and the two bosses 226 on the back side B. A circular recess 228 is provided on the lower surface 221*b* in a position lying in the vicinity of a proximal end portion of the left side plate 223 on each of the front side F and the back side B. A rectangular recess 229, which is elongated in the front-back direction FB, is provided on the lower surface 221*b* in a position lying in the vicinity of a proximal end portion of the right plate 224 on each of the front side F and the back side B. Multiple ribs 22A are provided along a longitudinal edge of the lower surface 221*b* on the right side R in such a manner as to be brought into contact with the right side plate 224. Nine ribs 22A are provided between the two front and back rectangular recesses 229. Two rectilinear protrusions 22C, which are elongated in the upper-lower direction UL, are provided on an inner surface of a portion of the right side plate 224 which corresponds to the protruding plate 224*b*1. The protruding plate 224*b*1 is reinforced by the rectilinear protrusions 22*c*, whereby the protruding plate 224*b*1 is restrained from being deformed.

As shown in FIG. 3, the light diffusing sheet 230 is provided as a thin substantially rectangular sheet component which is elongated in the front-back direction FB and includes a function to diffuse light. Circular holes 238 are provided at the front and back of the light diffusing sheet 230 on a left side L thereof in such a manner as to correspond to the circular recesses 228 of the case 220. A locking recess 234, which is cut into a slit, is provided in the vicinity of a front end of the light diffusing sheet 230 on a right side R thereof. A notched recess 235 is provided in a back side B of the locking recess 234.

Figure 5:
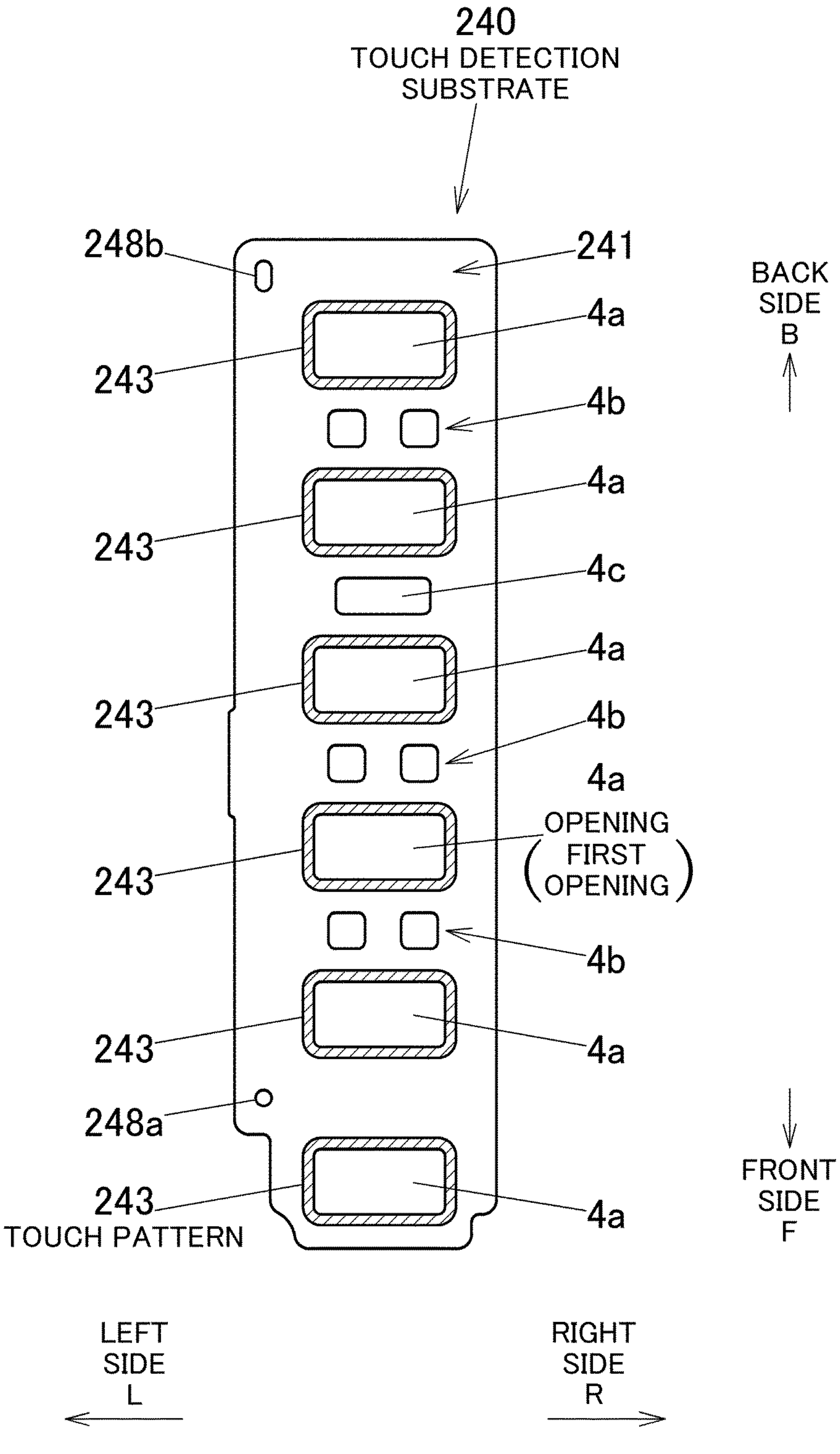
FIG. 5 is a plan view of a touch detection substrate of the input apparatus according to the embodiment of the present disclosure.

As shown in FIGS. 3 and 5, the touch detection substrate 240 is a substantially rectangular substrate which is elongated in the front-back direction FB and is made of a material which transmits no light. The touch detection substrate 240 includes multiple openings 4*a* (a first opening) which penetrate the touch detection substrate 240 into a substantially rectangular shape which is elongated in the left-right direction LR. The openings 4*a* are provided along the front-back direction FB, and in the present embodiment, six openings 4*a* are provided. Three pairs of openings 4*b*, each pair being made up of two small rectangular holes aligned in the left-right direction LR, and a rectangular opening 4*c*, which is smaller than the opening 4*a*, are provided in such a manner as to be disposed individually between the adjacent openings 4*a*. The openings 4*a*, 4*b*, 4*c* in the touch detection substrate 240 are disposed in such a manner as to correspond to the light transmission portions 11*a*, 11*b*, 11*c* in the panel 210 and the openings 2*a*, 2*b*, 2*c* in the case 220, respectively. As a result, the openings 4*a*, 4*b*, 4*c* are disposed to be aligned 4*a*, 4*a*, 4*b*, 4*a*, 4*b*, 4*a*, 4*c*, 4*a*, 4*b*, 4*a* sequentially from the front side F in that order.

A touch pattern 243, having a substantially rectangular annular shape as shown shaded in FIG. 5, is provided around an outer circumference of each of the openings 4*a* in the upper surface 241 of the touch detection substrate 240. The touch pattern 243 is an electrostatic capacity-type touch-sensitive or touch sensor and is provided on the outer circumference of each opening 4*a* through printing or the like. The touch pattern 243 can detect a change in electrostatic capacity inside the substantially rectangular annular shape. That is, the touch pattern 243 detects a change in electrostatic capacity in an opening area of the opening 4*a* (an area where the opening 4*a* is opened).

A circular penetrating hole 248*a* is provided in a position lying transversely leftmost on a front side F of the touch detection substrate 240, and an elongated penetrating hole 248*b*, which is elongated in the front-back direction FB, is provided in a position lying transversely leftmost on a back side B of the touch detection substrate 240. The circular hole 248*a* and the elongated hole 248*b* correspond to the circular recesses 228 of the case 220 and the holes 238 in the diffusing sheet 230.

Figure 6:
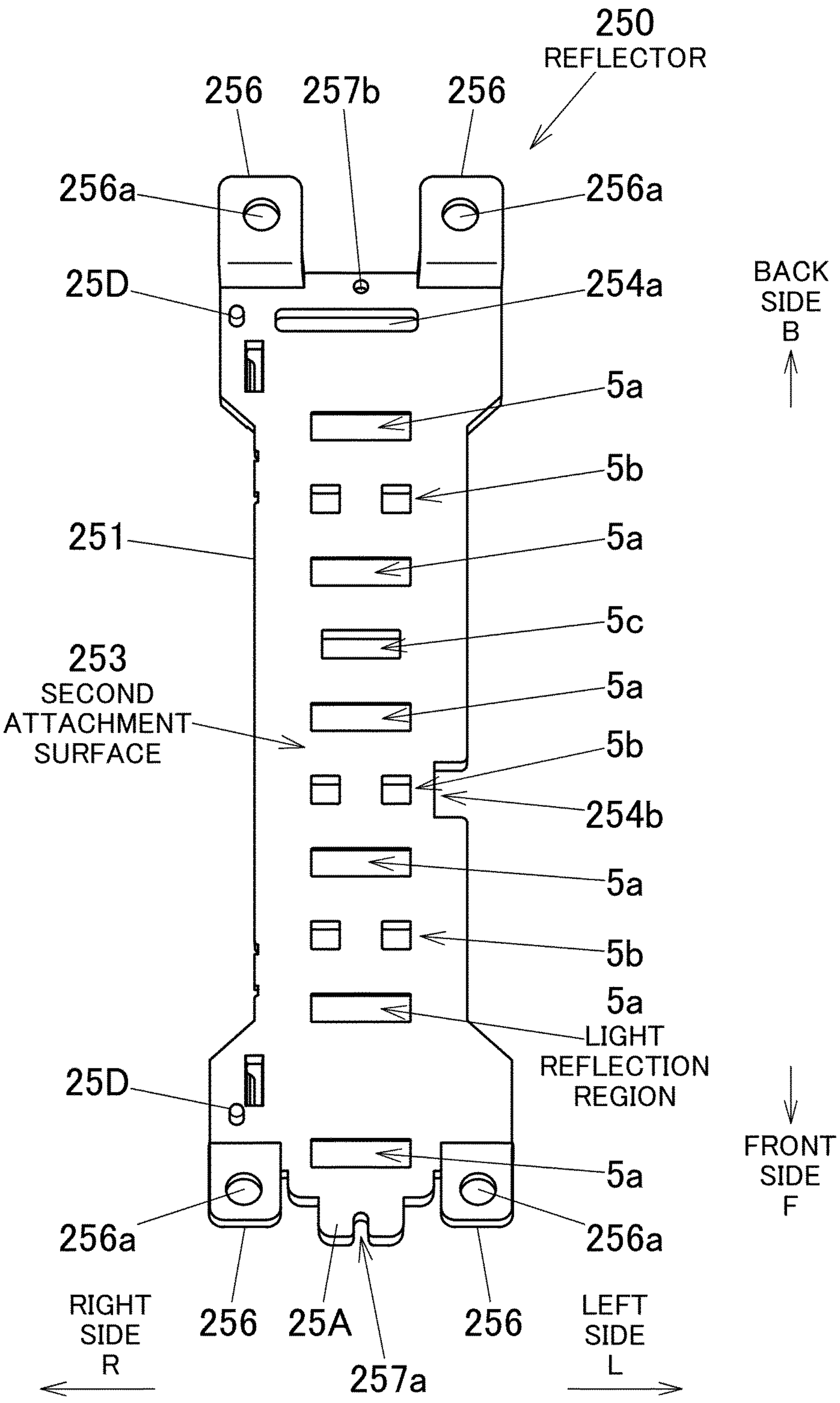
FIG. 6 is a perspective view of a reflector of the input apparatus according to the embodiment of the present disclosure as viewed from below.

As shown in FIGS. 3 and 6, the reflector 250 has a substantially rectangular shape which is elongated in the front-back direction FB. The reflector 250 has a reflector main body 251 of a substantially rectangular shape. A front and back end portions of the reflector main body 251 protrude in the left-right direction LR. Then, the reflector main body 251 has four leg sections 256 which are each cranked downwards. A screw attachment screw hole 256*a* is provided in each leg section 256 for insertion and penetration of a screw 25*b* (a fastening component). A lower surface of the reflector main body 251 is made into a second attachment surface 253.

Multiple light reflection regions 5*a*, 5*b*, 5*c* are provided in the reflector main body 251. The light reflection region 5*a* is a substantially rectangular hole which is elongated in the left-right direction LR and which has a shape of a frustum of quadrangular pyramid expanding towards an upper surface 252 of the reflector main body 251. A circumferential edge 5*al* along which the light reflection region 5*a* is opened in the second attachment surface 253 of the reflector main body 251 is formed into a perpendicular wall (refer to FIGS. 8A, 8B). The light reflection region 5*b* is a substantially rectangular hole slightly elongated in the front-back direction FB and having a shape of a frustum of quadrangular pyramid expanding towards the upper surface 252 of the reflector main body 251. Here, a pair of light reflection regions 5*b* are provided in such a manner as to be aligned in the left-right direction LR. The light reflection region 5*c* is a substantially rectangular hole made slightly smaller than the light reflection region 5*a* and having a shape of a frustum of quadrangular pyramid expanding towards the upper surface 252 of the reflector main body 251.

Six light reflection regions 5*a* are provided in the front-back direction FB, three pairs of light reflection regions 5*b* are provided in such a manner as to be disposed individually between the two adjacent light reflection regions 5*a*, and one light reflection region 5*c* is provided between two adjacent light reflection regions 5*a* in the six light reflection regions 5*a*. The light reflection regions 5*a*, 5*b*, 5*c* are disposed in such a manner as to correspond to the light transmission portions 11*a*, 11*b*, 11*c* in the panel 210, the openings 4*a*, 4*b*, 4*c* in the touch detection substrate 240 and the openings 2*a*, 2*b*, 2*c* in the case 220, respectively. As a result, the light reflection regions 5*a*, 5*b*, 5*c* are disposed to be aligned 5*a*, 5*a*, 5*b*, 5*a*, 5*b*, 5*a*, 5*c*, 5*a*, 5*b*, 5*a* sequentially from the front side F in that order.

A front and back positioning pins 258 are provided individually on a left side L of the laterally protruding portions provided at the front and back end portions of the upper surface 252 of the reflector main body 251. A front and back hook-shaped restraints 259 are provided individually on a right side R of the laterally protruding portions provided at the front and back end portions of the upper surface 252 of the reflector main body 251. A locking protrusion 254 is provided on a front side F of the front restraint 259. A protruding plate section 25A is provided substantially at a center in the left-right direction LR of a front end of the reflector main body 251 in such a manner as to protrude into a tongue-like shape. A cut recess 257*a* is provided in the protruding plate section 25A. A circular hole 275*b* is provided substantially at a center in the left-right direction LR of a back end of the reflector main body 251 in such a manner as to penetrate the back end portion of the reflector main body 251.

A front and back positioning pins 25D are provided on a right side R of the second attachment surface 253 in such a manner as to protrude downwards. The positioning pins 25D correspond to the circular hole 248*a* and the elongated hole 248*b* which are provided in the front and back of the touch detection substrate 240, the holes 238 in the light diffusing sheet and the recesses 228 on the case 220.

Additionally, a rectangular hole 254*a* is provided in the back end portion of the reflector main body 251 in such a manner as to be elongated in the left-right direction LR, and a recess 254*b* is provided substantially in a center in the front-back direction FB of a left edge of the reflector main body 251. The hole 254*a* and the recess 254*b* are provided so as to avoid an interference with an electronic component provided on the input apparatus 200 or other substrates.

The reflector 250 is formed integrally of a resin material. In the present embodiment, the reflector 250 is formed of a white resin material so that lights from the light emitting regions 6*a*, 6*b*, 6*c* are easily reflected at the light reflection regions 5*a*, 5*b*, 5*c*, respectively.

As shown in FIG. 3, the control substrate 260 is a substantially rectangular substrate which is elongated in the front-back direction FB and is made of a material which transmits no light. The multiple light emitting regions 6*a*, 6*b*, 6*c*, which each include the multiple light emitting elements 6*s*, are provided on the control substrate 260. In the present embodiment, the light emitting elements 6*s* are light emitting diodes (LED). The light emitting regions 6*a* excluding a second frontmost light emitting region 6*al* each include three LEDs which are disposed side by side in the left-right direction LR. The second frontmost light emitting region 6*al* includes five LEDs which are disposed side by side in the left-right direction LR. In the light emitting regions 6*b*, two LEDs are disposed side by side in the left-right direction LR.

The light emitting regions 6*a*, 6*b*, 6*c* are disposed in such a manner as to correspond to the light transmission portions 11*a*, 11*b*, 11*c* in the panel 210, the light reflection regions 5*a*, 5*b*, 5*c* in the reflector 250, the openings 4*a*, 4*b*, 4*c* in the touch detection substrate 240 and the openings 2*a*, 2*b*, 2*c* in the case 220, respectively. As a result, the light emitting regions 6*a*, 6*b*, 6*c* are disposed to be aligned 6*a*, 5*a*, 6*a*1 (6*a*), 6*b*, 6*a*, 6*b*, 6*a*, 6*c*, 6*a*, 6*b*, 6*a* sequentially from the front side F in that order. Here, in the light emitting regions 6*a*, 6*b*, 6*c*, a width (a length in the left-right direction LR) defined between a leftmost LED and a rightmost LED is substantially the same. As a result, a space defined between adjacent LEDs is the narrowest in the light emitting region 6*al* in which five LEDs are provided, and a space defined between adjacent LEDs is the widest in the light emitting region 6*b* in which two LEDs are provided.

An elongated hole 26D1, which is elongated in the front-back direction FB, is provided in a right side R of a front end portion of the control substrate 260 in such a manner as to penetrate the control substrate 260, and a circular hole 26D2 is provided in the right side R of a back end portion of the control substrate 260 in such a manner as to penetrate the control substrate 260. The elongated penetrating hole 26D1 and the circular penetrating hole 26D2 correspond to the front and back positioning pins 25D on the second attachment surface 253 of the reflector 250. Additionally, an IC chip (not shown) is provided in the control substrate 260 to control the illumination of the LEDs of the light emitting regions 6*a*, 6*b*, 6*c*.

The panel 210 is attached to the first attachment surface 221*a* of the case 220. A front and back edges and an edge on a right side R of the panel 210 are placed in the vicinity of or in contact with the raised section 221*c* of the case 220 so as to be positioned properly on the first attachment surface 221*a*. The panel 210 and the first attachment surface 221*a* can be attached to each other using an adhesive including a pressure sensitive adhesive double coated tape.

The touch detection substrate 240 is held by the lower surface 221*b* of the upper plate 221 which constitutes an opposite side to the first attachment surface 221*a* of the case 220 and the upper surface 252 of the reflector main body 251 which constitutes a surface opposite to the second attachment surface 253 of the reflector 250 therebetween. Specifically speaking, the touch detection substrate 240 is attached in the following manner.

The touch detection substrate 240 is restrained from moving in the upper-lower direction UL relative to the reflector 250 as a result of the right edge of the touch detection substrate 240 being brought into engagement with the restraints 259 of the reflector main body 251. In parallel with this, in the touch detection substrate 240, the front and back positioning pins 258 of the reflector 250 are inserted individually in the front circular hole 248*a* and the back elongated hole 248*b* in the touch detection substrate 240. In this way, the touch detection substrate 240 is positioned relative to the reflector 250. A dimensional error in distance between the positioning pins 258 is absorbed by the elongated hole 248*b*.

The light diffusing sheet 230 is interposed between the lower surface 221*b* of the case 220 and the touch detection substrate 240. The positioning pins 258 of the reflector 250 are inserted into the holes 238 of the diffusing sheet 230. No highly accurate positioning is required on the diffusing sheet 230, and hence, the positioning pins 258 are loosely fitted in the corresponding holes 238 to such an extent that an interference of the positioning pin 258 with the corresponding hole 238 is avoided. Additionally, the locking recess 234 in the light diffusing sheet 230 is locked on the locking protrusion 254 of the reflector 250, whereby the light diffusing sheet 230 is restrained from moving relative to the reflector 250 and the touch detection substrate 240. The light diffusing sheet 230 is prevented from interfering with the restraint 259 on the front side F of the reflector 250 by the recess 235 in the light diffusing sheet 230. Here, the light diffusing sheet 230 can be omitted depending upon the diffusing property of lights emitted from the light emitting regions 6*a*, 6*b*, 6*c*.

The control substrate 260 is attached to the second attachment surface 253 of the reflector 250. As this occurs, the positioning pin 25D on the front side F of the reflector 250 is inserted into the elongated hole 26D1 on the front side F of the control substrate 260, and the positioning pin 25D on the back side B of the reflector 250 is inserted into the circular hole 26D2 in the back side B of the control substrate 260. In this way, the control substrate 260 is positioned relative to the reflector 250. The control substrate 260 and the reflector 250 can be fixed together using an adhesive including a pressure sensitive adhesive double coated tape.

Figure 7:
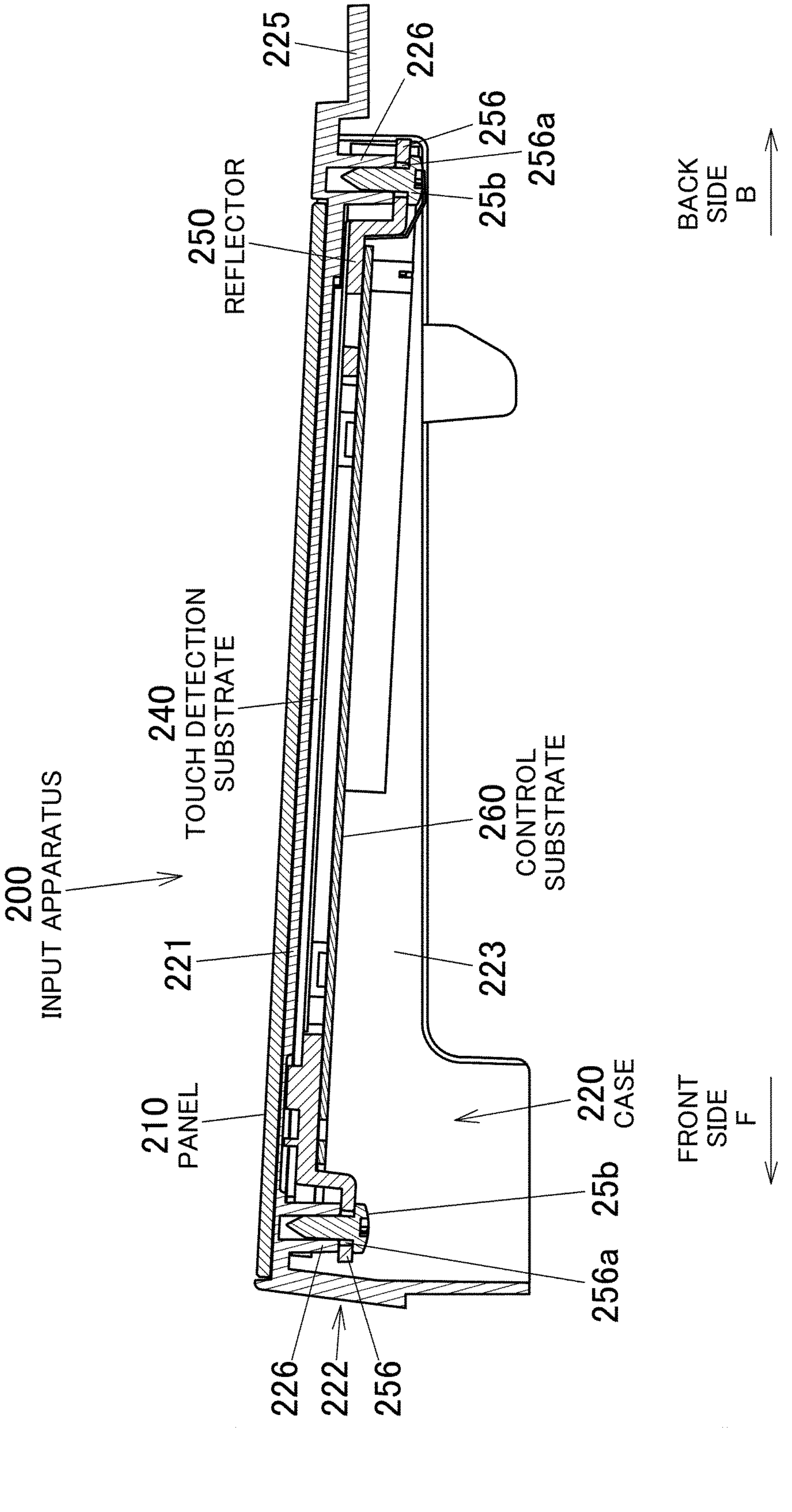
FIG. 7 is a sectional view of the input apparatus according to the embodiment of the present disclosure taken along a line VII-VII in FIG. 2.

As shown in FIG. 7, the reflector 250 is fixed to the case 220 by screwing the screws 25*b* (the fastening component) into the bosses 226 via the screw attachment screw holes 256*a* in the leg sections 256 of the reflector 250. As shown in FIGS. 3, 4 and 6, when the reflector 250 is fixed to the case 220, the cut recess 257*a* at the front end of the reflector 250 is brought into engagement with the positioning pin 227 on the front side F of the case 220, and the positioning pin 227 on the back side B of the case 220 is inserted into the hole 257*b* on the back side B of the reflector 250, whereby the reflector 250 is positioned relative to the case 220.

Here, an interference of the positioning pins 258 of the reflector 250 with the upper plate 221 of the case 220 is avoided by the circular recesses 228 on the case 220. Similarly, an interference of the restraints 259 of the reflector 250 with the upper plate 221 of the case 220 is avoided by the rectangular recesses 229 in the case 220. Further, the multiple ribs 22A of the case 220 are placed in the vicinity of or in contact with a right edge surface of the reflector main body 251 and also ensures the rigidity of the case 220. As a result, the multiple ribs 22A provides a feeling of rigidity when the user operates the touch switches.

Figure 8A:
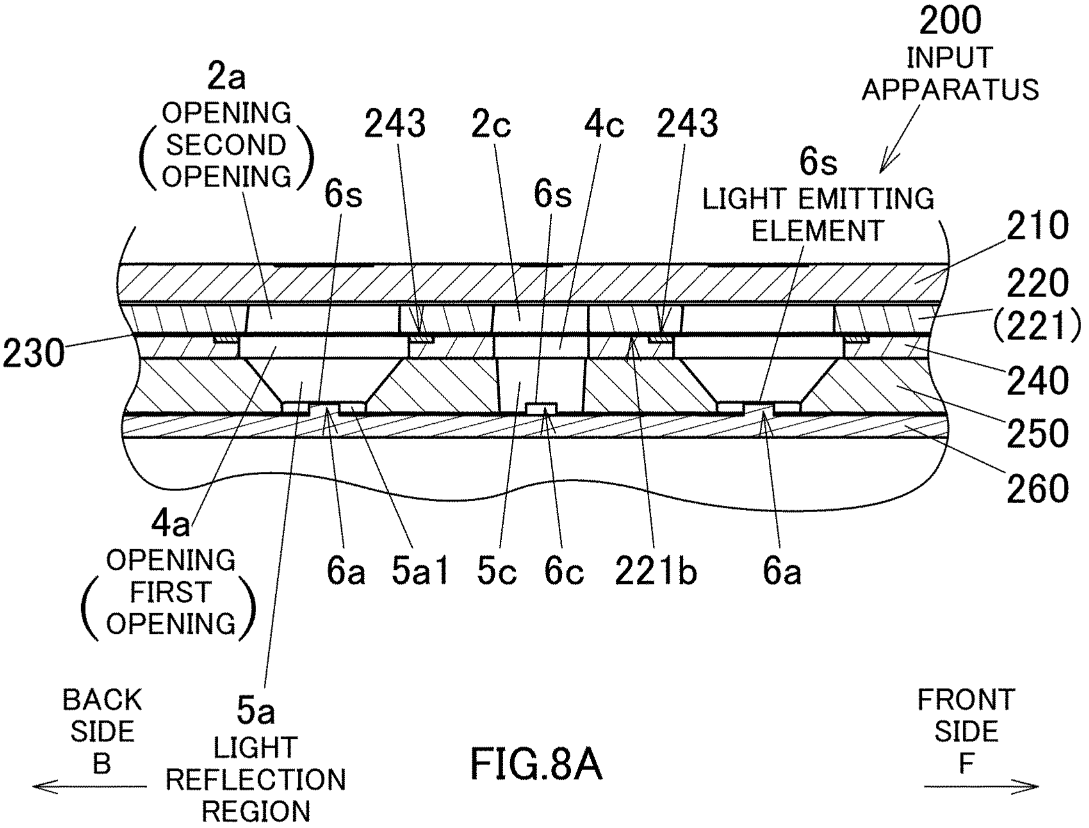
FIG. 8A is a sectional view of the input apparatus according to the embodiment of the present disclosure taken along a line VIIIa-VIIIa in FIG. 2.
Figure 8B:
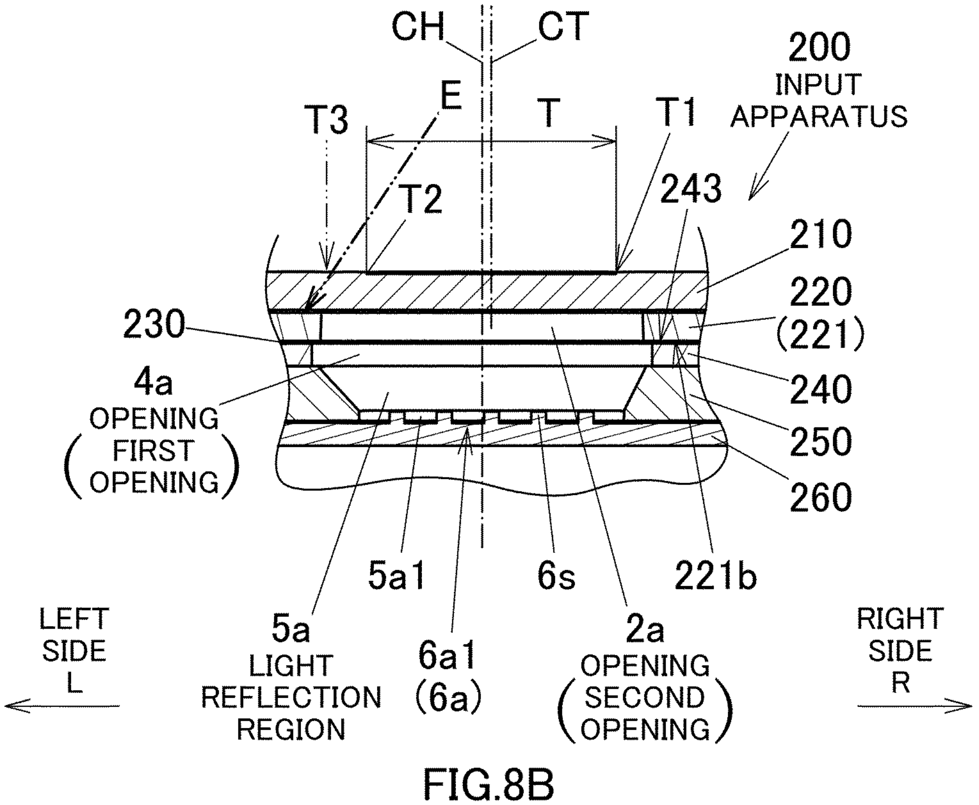
FIG. 8B is a sectional view of input apparatus according to the embodiment of the present disclosure taken along a line VIIIb-VIIIb in FIG. 2.

When the input apparatus 200 is built up in the way described heretofore, the panel 210, the upper plate 221 of the case 220, the touch detection substrate 240, the reflector 250 and the control substrate 260 are superposed one on another as shown in FIGS. 8A, 8B. Here, the light emitting elements 6*s*, which are LEDs, of the light emitting regions 6*a* are disposed individually within the areas of the corresponding openings 4*a* in the touch detection substrate 240 (within the ranges where the openings 4*a* are opened as viewed perpendicularly from above the touch surface 211). In addition, the light emitting elements 6*s* of the light emitting regions 6*a* are disposed in such a manner as to correspond to the light reflection regions 5*a* of the reflector 250. In other words, the light emitting elements 6*s* of the light emitting regions 6*a* are disposed within areas on the second attachment surface 253, which is the lower surface of the reflector main body 251, where the light reflection regions 5*a* are opened. Then, the openings 2*a* in the case 220 (the upper plate 221) are disposed within the areas of the openings 4*a* in the touch detection substrate 240. In other words, the openings 4*a* in the touch detection substrate 240 are provided larger than the openings 2*a* in the case 220, and the case 220 (the upper plate 221) is disposed directly on the touch patterns 243.

With the input apparatus 200 configured as has been described heretofore, even in the event that the touch patterns 243 of the touch detection substrate 240 fail, the touch substrate 240 can easily be removed by removing the reflector 250 which is fixed to the case 220 with screws 25*b* (the fastening component). That is, the case 220 and the reflector 250 are detachably fixed together with the screws 25*b* (the fastening component). Additionally, no air layer exists directly on the touch patterns 243, and the lower surface 221*b* of the upper plate 221 of the case 220 is disposed in the vicinity of or in contact with the touch patterns 243. As a result, a touch detection using the touch pattern 243 can be performed effectively.

Here, as has been described before, the lower surface of the panel 210 is painted black. However, the lower surface of the panel 210 is painted black on the other portions than the portions corresponding to the light emitting regions 6*a*, 6*b*, 6*c* and the openings 4*a*, 4*b*, 4*c*, 2*a*, 2*b*, 2*c* so that lights from the light emitting regions 6*a*, 6*b*, 6*c* become visible. The portions of the panel 210 which are not painted black are made into the light transmission portions 11*a*, 11*b*, 11*c* which correspond to the light emitting regions 6*a*, 6*b*, 6*c* and the openings 4*a*, 4*b*, 4*c*, 2*a*, 2*b*, 2*c* to allow the passage of lights from the light emitting regions 6*a*, 6*b*, 6*c*, respectively. Lights emitted from the light emitting elements 6*s* are released to the exterior of the panel 210 by way of the openings 4*a*, 4*b*, 4*c* and the openings 2*a*, 2*b*, 2*c* and further the light transmission portions 11*a*, 11*b*, 11*c*.

More specifically speaking, the light transmission portions 11*a*, 11*b*, 11*c* are provided through printing or the like so that letters and symbols which indicate the details of operations performed by touch operations can be recognized by lights that are transmitted through the light transmission portions 11*a*, 11*b*, 11*c*. Specifically speaking, an outer circumference of a letter or symbol is printed a darker color to shield light, while the letter or symbol is made transparent. Here, as shown in FIG. 8B, a range on the light transmission portion 11*a* where a letter is written or displayed will be referred to as a display range T. Then, a center CT in the left-right direction LR of the display range T is set closer to the right side R than a center CH in the left-right direction LR of the openings 2*a*, 4*a* and the light reflection region 5*a*. That is, the center CT is caused to deviate from the center CH.

The input apparatus 200 is disposed at the left keyboard wing 38L of the left side L. Consequently, when the player, who sits in the substantially central position in the left-right direction LR, sees the input apparatus 200, the player sees obliquely the display range T from the right and above the display range T as indicated by a line of sight E. In the case that the center CT of the display range T is aligned with the center CH of the openings 2*a*, 4*a* and the light reflection region 5*a*, a left end T3 of the display range T comes near to an edge on a left side L of the opening 2*a*. Then, as indicated by the line of sight E, the vicinity of the left end T3 of the display range T is seen as being positioned further leftwards than the left side L of the opening 2*a* from the player's position, and hence, light from the light emitting region 6*a* does not pass through the relevant portion of the display range T, resulting in a case in which in the letters printed on the display range T, a letter or letters lying near to the left end T3 of the display range T become invisible as if a part of the letter or some of the letters are missing. Due to this, the center CT of the display range T is disposed further to the right side R than the center CH of the openings 2*a*, 4*a* and the light reflection region 5*a*. Here, since a right side R of the opening 2*a* does not overlap the line of sight E, a letter at a right end of the display range T still remains visible properly even though the letter comes nearer to an edge on the right side R of the opening 2*a*. That is, as shown in a surrounded view in FIG. 2, a region TL on the left side L of the display range T and a region TR on the right side of the display range T are set as TR<TL.

According to the embodiment of the present disclosure that has been described heretofore, the input apparatus 200 includes the touch detection substrate 240 which has the openings 4*a* as the first opening and in which the touch patterns 243 are provided individually on the outer circumferences of the openings 4*a*, the control substrate 260 having the light emitting elements 6*s*, the reflector 250 provided between the touch detection substrate 240 and the control substrate 260 and including the light reflection regions 5*a* which are disposed in such a manner as to correspond to the light emitting elements 6*s*, the panel 210 including the touch surface 211, and the case 220 having the openings 2*a* as the second opening and to which the panel 210 is attached.

Then, lights emitted from the light emitting elements 6*s* are released to the exterior of the case 220 by way of the openings 4*a* and the openings 2*a*. Additionally, the case 220 and the reflector 250 are detachably fixed together with the screws 25*b*, which constitute the fastening component. That is, the opening area of the second opening (the opening 2*a*) is smaller than the opening area of the first opening (the opening 4*a*).

With this configuration, the touch detection substrate 240 is held by the lower surface 221*b* of the upper plate 221 of the case 220 and the upper surface 252 of the reflector 250 therebetween, and hence, even in the case that the touch patterns fail, the touch detection substrate 240 can easily be replaced only by detaching the reflector 250 from the case 220. Then, the lower surface 22*b* of the upper plate 221 of the case 220 is disposed directly on the touch patterns, and hence, no air layer is interposed therebetween, whereby an effective touch detection can be performed.

The light diffusing sheet 230 is provided between the case 220 and the touch detection substrate 240. As a result, even in the case that a semiconductor light emitting element such as an LED is used for the light emitting element 6*s*, diffuse light can be shined on the light transmission portions 11*a* of the panel 210, whereby the light transmission portions 11*a* can be illuminated uniformly.

The reflector 250 and the touch detection substrate 240 are positioned by the positioning pins 258. As a result, once the reflector 250 is positioned relative to the case 220, the touch patterns 243 can also easily be positioned relative to the panel 210.

The display range T for a letter or letters and a symbol which are disposed within the area of the opening 2*a* is set on the touch surface 211. As a result, the setting work can be performed easily, and the design property of the input apparatus 200 can be enhanced by exhibiting the operation touch panel which is illuminated.

Lights emitted from the light emitting elements 6*s* are released to the exterior of the case 220 by way of the first opening and the second opening. The center CT of the display range T is caused to deviate from the center CH in the left-right direction LR of the opening 2*a* and the like. As a result, even though the input apparatus 220 is viewed obliquely, a letter displayed in the display range T can be seen properly and clearly without missing an end portion of the letter.

The electronic keyboard instrument 1 as the electronic apparatus includes the input apparatus 200 which is provided at the keyboard wing. As a result, the electronic keyboard instrument 1 (the electronic apparatus) can be provided which includes the input apparatus 200 which is highly repairable and which can perform a touch detection effectively. In addition, the electronic apparatus includes the input apparatus of the present disclosure, a control unit, and an output configured to execute outputting in response to an input from the input apparatus.

Thus, the embodiment of the present invention has been described heretofore, however, the technical scope of the present invention is not limited by the embodiment, and hence, the technical scope of the present invention is determined based on descriptions of claims to be made below. Further, the scope of an equivalent to which a modification which is irrelevant to the essentials of the present invention is made based on the descriptions of the claims is also included in the technical scope of the present invention.

What is claimed is:

1. An input apparatus comprising:
a touch detection substrate having a first opening and including a touch pattern provided on an outer circumference of the first opening;
a control substrate having a light emitting element;
a reflector provided between the touch detection substrate and the control substrate and including a light reflection region disposed in such a manner as to correspond to the light emitting element;
a panel including a touch surface; and
a case having a second opening and to which the panel is attached,
wherein light emitted by the light emitting element is released to an exterior by way of the first opening and the second opening, and
wherein the case and the reflector are detachably fixed together with a fastening component.

2. The input apparatus according to claim 1,
wherein an opening area of the second opening is smaller than an opening area of the first opening.

3. An electronic apparatus comprising:
the input apparatus according to claim 2; and
an output apparatus.

4. The input apparatus according to claim 1,
wherein a light diffusing sheet is provided between the case and the touch detection substrate.

5. An electronic apparatus comprising:
the input apparatus according to claim 4; and
an output apparatus.

6. The input apparatus according to claim 1,
wherein the touch detection substrate is positioned by a positioning pin provided on the reflector.

7. An electronic apparatus comprising:
the input apparatus according to claim 6; and
an output apparatus.

8. The input apparatus according to claim 1,
wherein the touch surface includes a display range for a letter or a symbol within an area of the second opening.

9. The input apparatus according to claim 8,
wherein a center of the display range is caused to deviate from a center of the second opening.

10. An electronic apparatus comprising:
the input apparatus according to claim 9; and
an output apparatus.

11. An electronic apparatus comprising:
the input apparatus according to claim 8; and
an output apparatus.

12. An electronic keyboard instrument comprising:
the input apparatus according to claim 1; and
a keyboard,
wherein the input apparatus is provided in a position of a keyblock which lies adjacent to the keyboard.

13. An electronic apparatus comprising:
the input apparatus according to claim 1; and
an output apparatus.

* * * * *